(12) United States Patent
Zhou et al.

(10) Patent No.: US 11,930,517 B2
(45) Date of Patent: Mar. 12, 2024

(54) CSI DIFFERENCE REPORT

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/405,693

(22) Filed: Aug. 18, 2021

(65) Prior Publication Data

US 2022/0078809 A1  Mar. 10, 2022

Related U.S. Application Data

(60) Provisional application No. 63/075,008, filed on Sep. 4, 2020.

(51) Int. Cl.
| | |
|---|---|
| *H04W 72/20* | (2023.01) |
| *H04L 1/1812* | (2023.01) |
| *H04L 1/1867* | (2023.01) |
| *H04L 5/00* | (2006.01) |
| *H04W 72/1263* | (2023.01) |
| *H04W 72/54* | (2023.01) |

(52) U.S. Cl.
CPC .......... *H04W 72/54* (2023.01); *H04L 1/1819* (2013.01); *H04L 1/1896* (2013.01); *H04L 5/0051* (2013.01); *H04W 72/1263* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2019/0364591 | A1* | 11/2019 | Berglund | H04L 1/0027 |
| 2022/0116183 | A1* | 4/2022 | Gao | H04L 1/1812 |
| 2022/0303857 | A1* | 9/2022 | Zhang | H04W 36/0085 |

* cited by examiner

*Primary Examiner* — Brandon M Renner
(74) *Attorney, Agent, or Firm* — Procopio, Cory, Hargreaves & Savitch LLP

(57) ABSTRACT

Methods, computer programs products, and apparatuses for CSI difference report are provided. An example method at a UE includes receiving, from a base station, a configuration for a channel state information (CSI) difference report that reports one or more statistics for a difference between at least one source CSI associated with a channel state information reference signal (CSI-RS) and at least one target CSI associated with a physical downlink shared channel (PDSCH) or a physical downlink control channel (PDCCH). The example method further includes transmitting, to the base station, the CSI difference report based on the received configuration.

28 Claims, 12 Drawing Sheets

CSI DIFFERENCE REPORT

CROSS REFERENCE TO RELATED APPLICATION(S)

This application claims the benefit of and priority to U.S. Provisional Application Ser. No. 63/075,008, entitled "CSI DIFFERENCE REPORT" and filed on Sep. 4, 2020, which is expressly incorporated by reference herein in its entirety.

INTRODUCTION

The present disclosure relates generally to communication systems, and more particularly, to wireless communication systems with channel state information (CSI) reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer program products, and apparatuses for CSI difference reporting are provided. In one aspect of the disclosure, a method, a computer-readable medium, and an apparatus are provided for wireless communication at a user equipment (UE). The UE receives, from a base station, a configuration for a CSI difference report that reports one or more statistics for a difference between at least one source CSI associated with a channel state information reference signal (CSI-RS) and at least one target CSI associated with a physical downlink shared channel (PDSCH) or a physical downlink control channel (PDCCH). The UE transmits, to the base station, the CSI difference report based on the received configuration.

In another aspect of the disclosure, a method, a computer-readable medium, and an apparatus are provided for wireless communication at a base station. The base station transmits, to a UE, a configuration comprising a set of triggering conditions for transmitting a CSI difference report that reports one or more statistics for at least one source CSI associated with a CSI-RS and at least one target CSI associated with a PDSCH. The base station may receive the CSI difference report from the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
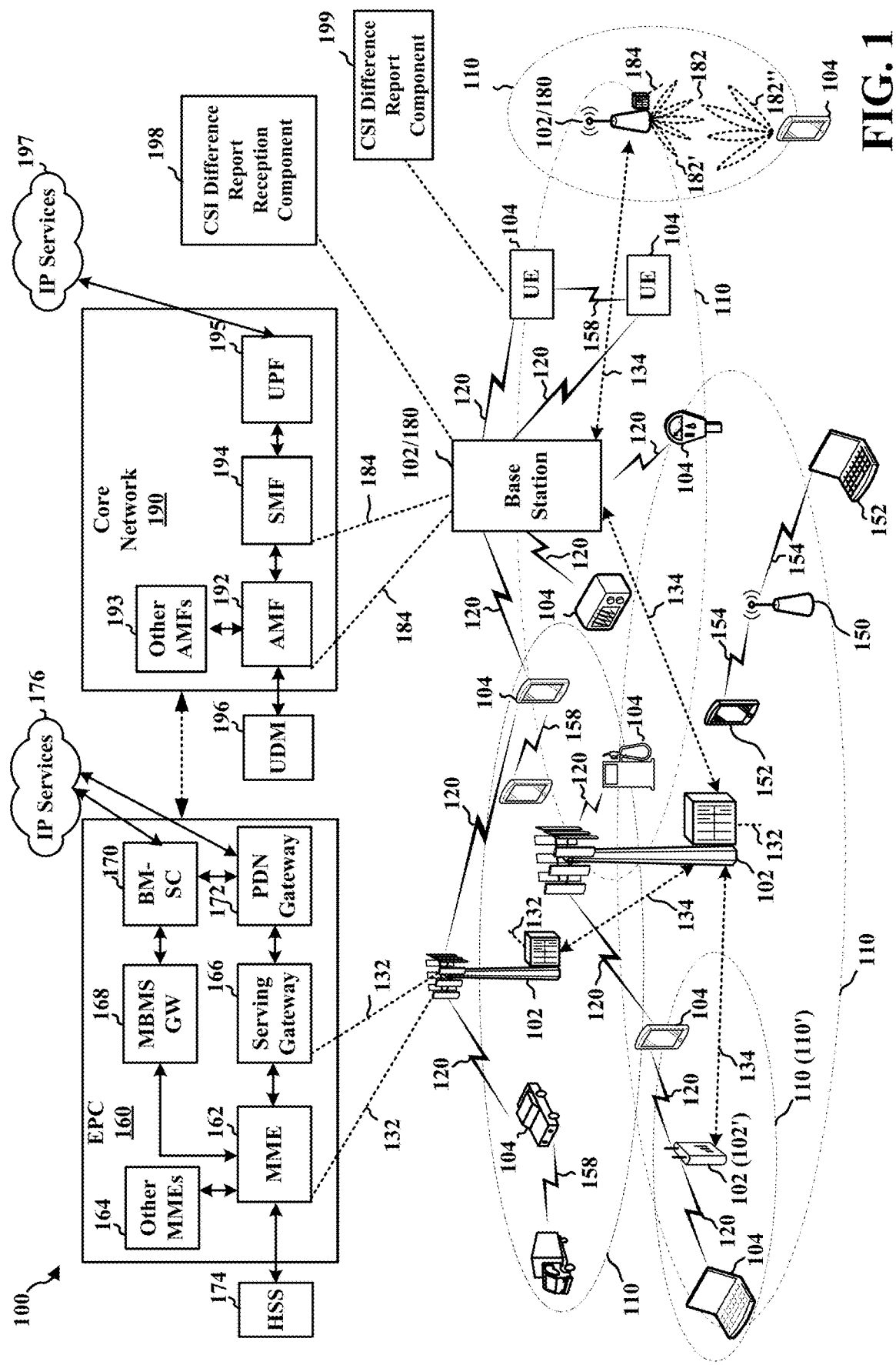
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102/180 includes a CSI difference report reception component 198 configured to transmits, to the UE 104, a configuration comprising a set of triggering conditions for transmitting a CSI difference report that reports one or more statistics for at least one source CSI associated with a CSI-RS and at least one target CSI associated with a PDSCH and receives the CSI difference report from the UE 104.

In certain aspects, the UE 104 includes a CSI difference report component 199 configured to receive, from the base station 102/180, a configuration for a CSI difference report that reports one or more statistics for a difference between at least one source CSI associated with a CSI-RS and at least one target CSI associated with a PDSCH and transmit, to the base station 102/180, the CSI difference report based on the received configuration.

Although the following description may be focused on 5G NR, the concepts described herein may be applicable to other similar areas, such as LTE, LTE-A, CDMA, GSM, and other wireless technologies.

Figure 2:
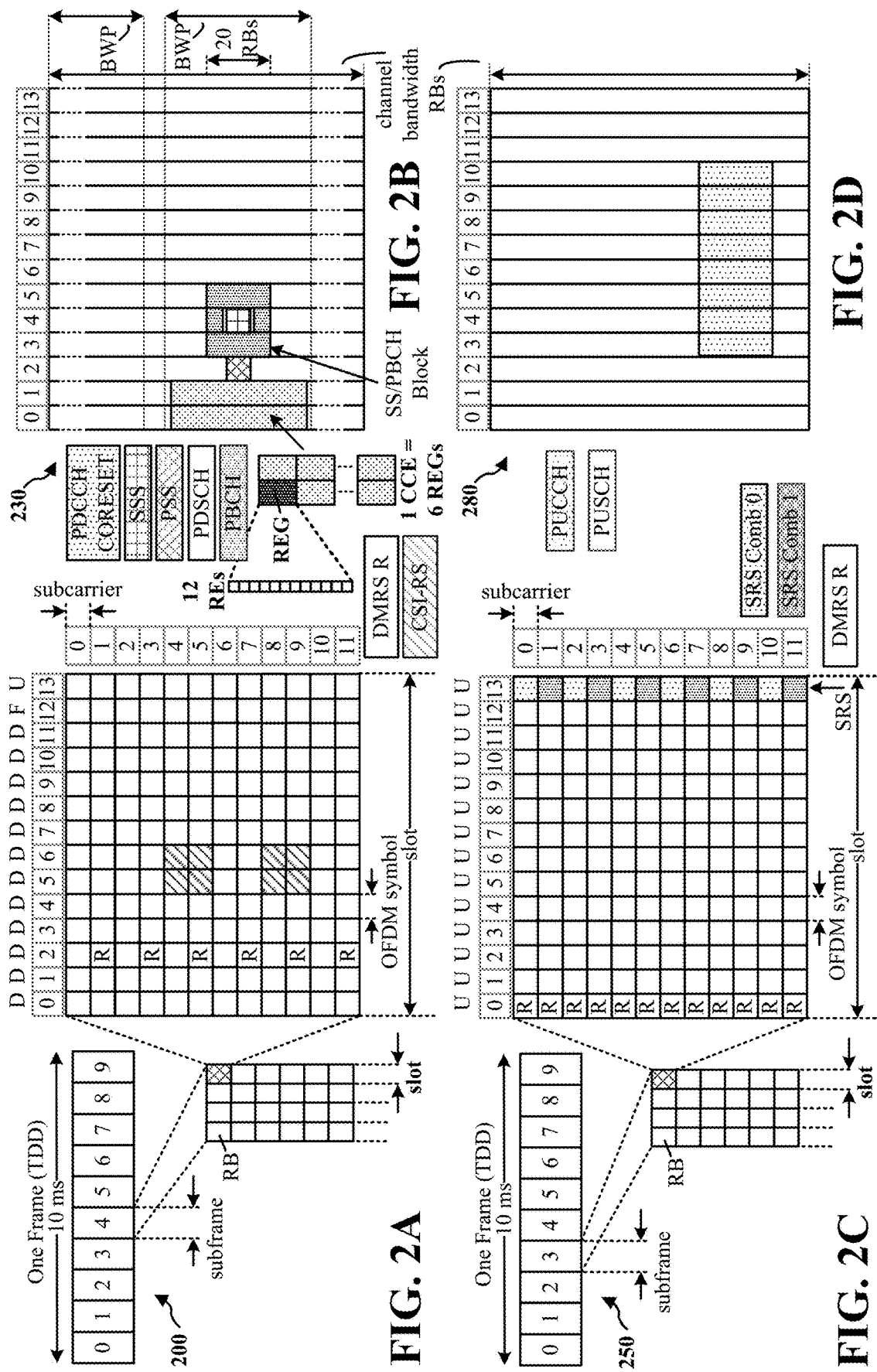
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15[\text{KHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
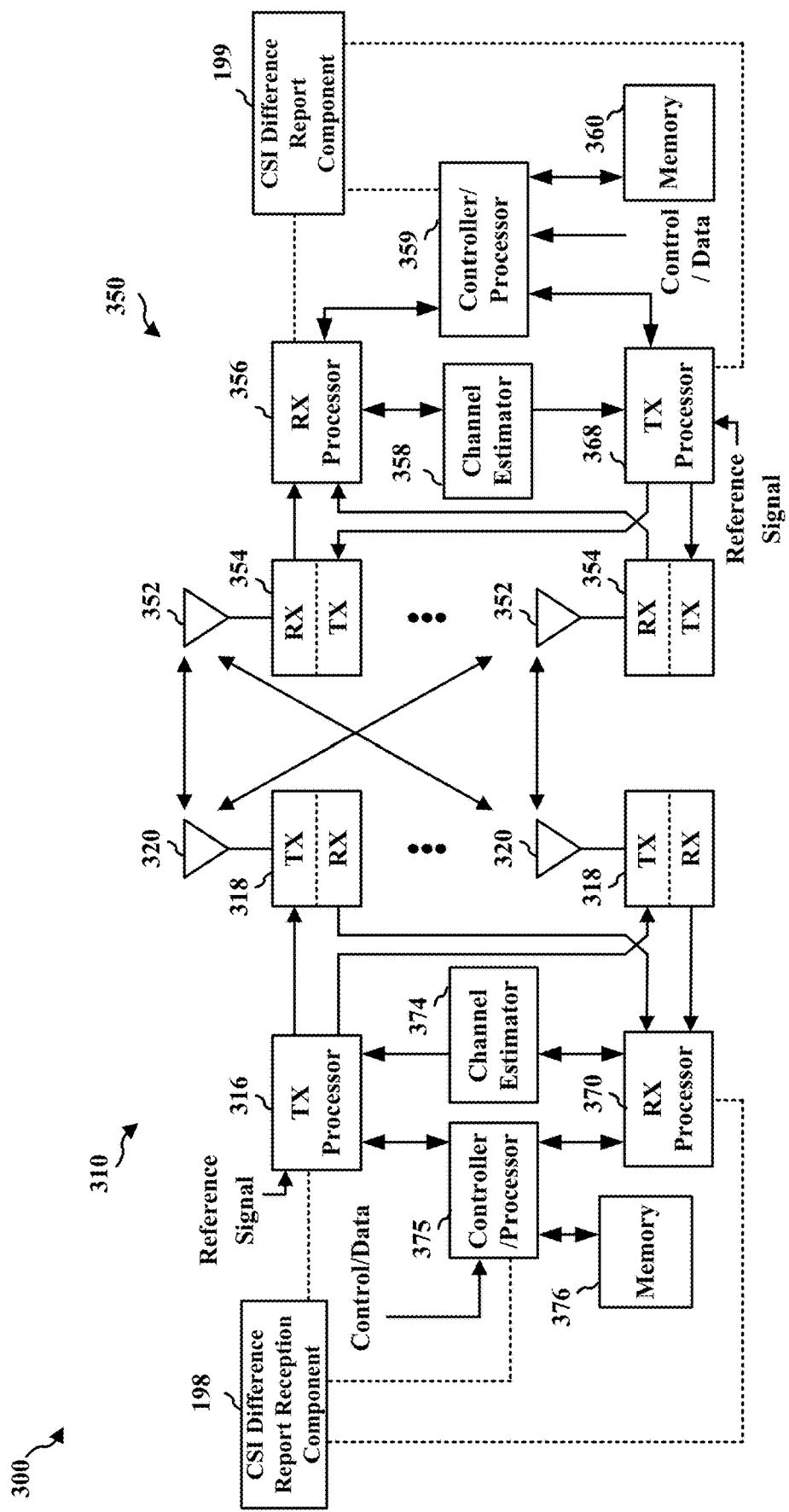
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with CSI difference report component 199 of FIG. 1.

At least one of the TX processor 316, the RX processor 370, and the controller/processor 375 may be configured to perform aspects in connection with CSI difference report reception component 198 of FIG. 1.

In wireless communication systems, CSI reporting including CQI reporting may be utilized to provide a base station (e.g., the base station 102 or 180) with channel information. The base station may utilize the channel information received from the UE to configure resources and parameters for uplink/downlink transmissions to facilitate efficient resource usage and higher quality communications. The CSI reporting may be for periodic or semi-persistent scheduling (SPS) PDSCH, in some examples. The CSI reporting, e.g., including CQI reporting, may be periodic (P), aperiodic (AP), or semi-persistent (SP). The CSI reporting including CQI reporting may be based on measuring CSI-RS. In some examples, the UE may measure a periodic or semi-persistent CSI-RS and may use the measurements to generate the CSI report. In some URLLC or Industrial IoT (IIoT) wireless communication systems, P/SP CSI reporting including CQI reporting based on measuring CSI-RS may be outdated compared with a subsequent actual PDSCH transmission. A base station may utilize the outdated CSI reports including CQI reports to adjust transmission parameters and configure resources for communication, which may lead to a reduce quality for the PDSCH.

To provide more up-to-date CSI reports, e.g., including CQI reports, the UE may report a difference between a source CSI report measured based on CSI-RS and a target CSI for the actual PDSCH transmissions in a CSI difference report. With the CSI difference report, a base station may better adjust transmission parameters and configure resources based on the more up-to-date CSI difference report.

Figure 4:
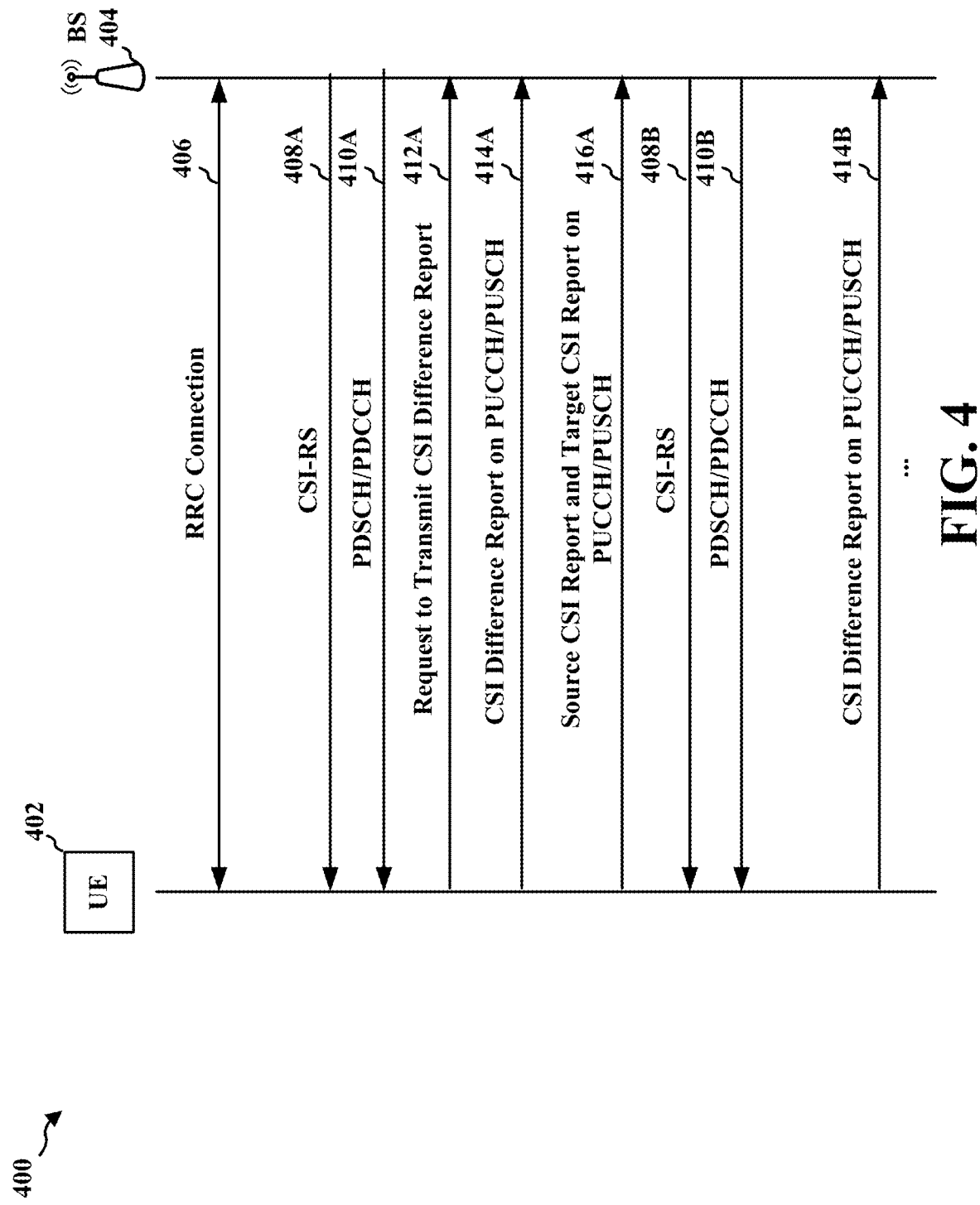
FIG. 4 illustrates an example communication between a base station and a UE.

FIG. 4 illustrates an example communication flow 400 that includes a UE 402 and a base station 404. As illustrated in FIG. 4, the UE 402 and base station 404 may have established RRC connection 406. The base station 404 may transmit CSI-RS 408A, such as P/AP/SP CSI-RS, to the UE 402 to facilitate CSI reporting. In response to receiving the CSI-RS 408A, based on the CSI-RS 408A, the UE may measure CSI based on the CSI-RS and/or may generate a CSI report that includes one or more of a CQI, a reference signal received power (RSRP), a signal to noise and interference ratio (SINR), a reference signal received quality (RSRQ), or a rank indicator (RI). The CSI report generated based on the CSI-RS 408A may be referred to as a "source CSI report".

A CQI may correspond with an MCS. For example, one CQI may be mapped to one or more MCS. An example mapping between CQI and MCS may be provided by the table below:

TABLE 2

| CQI index | modulation | code rate × 1024 | efficiency |
|---|---|---|---|
| 0 | | out of range | |
| 1 | Quadrature Phase Shift Keying (QPSK) | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 Quadrature amplitude modulation (16QAM) | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

For example, a combination of MCS and transport block size may correspond to a CQI index if 1) the combination may be signaled for transmission on the PDSCH in the CSI reference resource according to a transport block size determination, 2) the MCS is indicated by the CQI index in the table, or 3) the combination of transport block size and modulation scheme when applied to the reference resource results in an effective channel code rate which is the closest possible to the code rate indicated by the CQI index. If more than one combination of transport block size and modulation scheme results in an effective channel code rate equally close to the code rate indicated by the CQI index, the combination with the smallest of such transport block sizes may be relevant.

An example table below provides example MCS index table for PDSCH:

TABLE 3

| MCS Index IMCS | Modulation Order Qm | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

The base station 404 may transmit a PDSCH/PDCCH 410A, such as a semi-persistent scheduling transmission or a dynamic grant (DG) transmission or a PDCCH transmission, to the UE 402. The PDSCH/PDCCH 410A may include a DM-RS. Upon receiving the PDSCH/PDCCH 410A, the UE 402 may measure CSI based on the DM-RS and/or may generate another CSI report based on the DM-RS. The CSI report generated based on the DM-RS may be referred to as a "target CSI report".

In some aspects, the base station 404 may configure the UE 402 to report a difference, or other statistic, between the source CSI and the target CSI. For example, the base station 404 may configure the UE to report a CQI difference, or a statistic based on multiple measured CQI differences, such as one or more of a minimum CQI difference, a maximum CQI difference, an average CQI difference, a histogram of multiple CQI differences, a percentile for the measured CQI differences, etc. In some aspects, a "difference" may be referred to as a "delta." Although the examples are provided for a CQI difference, the base station 404 may similarly configure the UE 402 to provide a difference, or a statistic, for another CSI metric, such as an RSRP, an SINR, an RSRQ, or an RI. In some aspects, the base station 404 may further transmit a configuration for reporting the difference to the UE 402, such by transmitting the configuration in RRC connection 406. The configuration may include triggering conditions for transmitting the CSI difference report. For example, the trigger conditions may be based on the CSI difference such as the CQI difference exceeding a threshold or corresponding statistics metric cross a threshold. For example, the triggering conditions may define that an average of 5 percentiles of CQI difference over a set of source/ target CSI reports triggers the CSI difference reporting. In some aspects, the source CSI report and the target CSI report may be wideband CSI statistics in a bandwidth part (BWP). In some aspects, the source CSI report and the target CSI report may be subband CSI statistics in a bandwidth part (BWP).

In some aspects, a mapping of the source CSI report and the target CSI report may be transmitted by the base station to the UE 402 in the RRC signaling such as the RRC connection 406, medium access control (MAC) control element (CE) (MAC-CE), or downlink control information (DCI).

The UE 402 may transmit the CSI difference report on PUCCH/PUSCH 414A. In some aspects, the PUCCH/PUSCH 414A may be configured (including being preconfigured), piggybacked on top of known UL transmissions (e.g., MAC-CE piggybacked on PUCCH), or dynamically requested by the UE 402 in a request 412A to transmit CSI difference report in scheduling request (SR) or uplink control information (UCI) bits. In some aspects, the PUCCH/PUSCH 414A may be the uplink resources that carry HARQ feedback for the PDSCH/PDCCH 410A. In some aspects, PUCCH/PUSCH 414A may not be the uplink resources that carry the HARQ feedback for the PDSCH/PDCCH 410A.

In some aspects, the UE 402 may autonomously determine to transmit the CSI difference report. Then the UE 402 may transmit a request 412A to transmit CSI difference report via SR, MAC-CE, or UCI bits sent together with the HARQ feedback. In some aspects, the UE 402 may autonomously determine to transmit the CSI difference report based on various difference thresholds such as the CQI difference threshold.

In some aspects, in addition to transmitting the CSI difference report on PUCCH/PUSCH 414A, the UE 402 may transmit the source CSI report and the target CSI report on PUCCH/PUSCH 416A. The uplink resources in PUCCH/PUSCH 416A may be P/SP/AP uplink resources configured by the base station 404. In some aspects, the UE 402 may not transmit the source CSI report and the target CSI report on PUCCH/PUSCH 416A.

The base station 404 may transmit additional CSI-RS 408B and additional PDSCH/PDCCH 410B. The UE 402 may generate source CSI reports and target CSI reports based on the CSI-RS 408B and additional PDSCH/PDCCH 410B. In some aspects, the UE 402 may be configured (such as by the base station 404) to report CSI difference in a CSI difference report on PUCCH/PUSCH 414B including statistics for more than one source CSI reports and more than one target CSI reports. For example, the base station 404 may configure the UE 402 to report a minimum difference, a maximum difference, an average difference, a histogram, a percentile statistic, or the like. In some aspects, the UE may start a timer after transmitting the CSI difference report. The UE may not transmit, or may refrain from transmitting, another CSI difference report until the timer expires.

Figure 5:
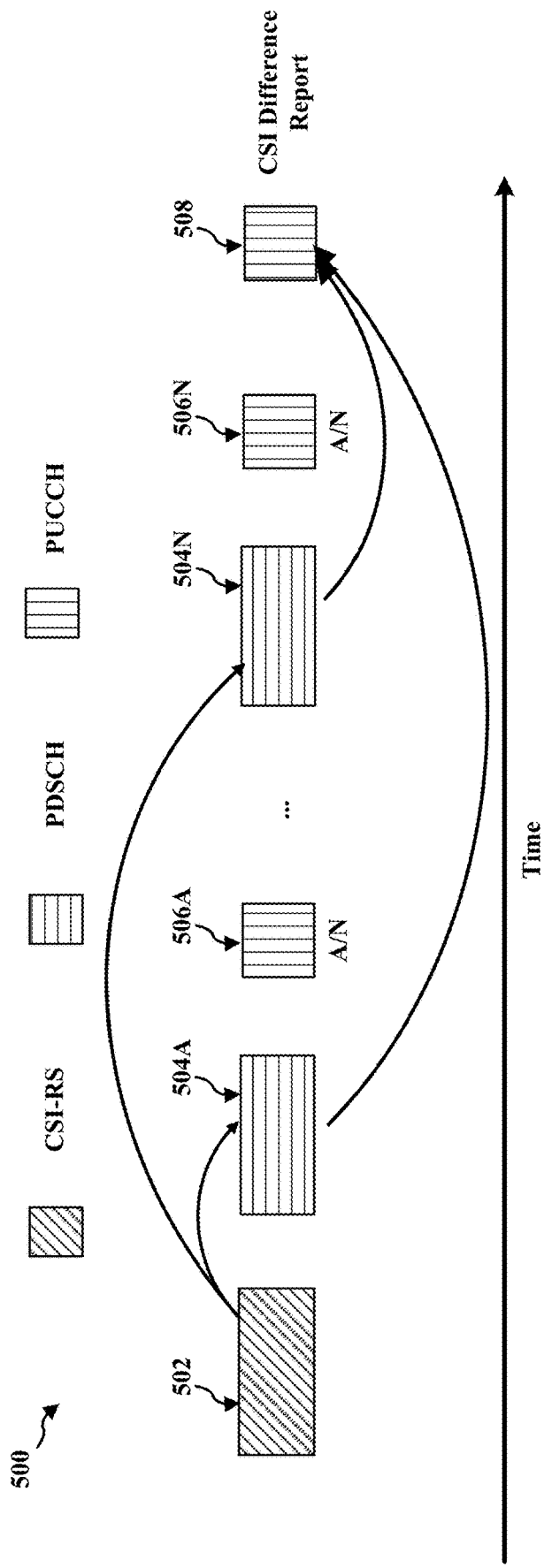
FIG. 5 illustrates an example communication between a base station and a UE.

FIG. 5 illustrates an example communication 500 for transmitting CSI difference reports. As illustrated in FIG. 5, CSI-RS 502 such as P/SP CSI-RS may be transmitted from a base station to a UE. Upon receiving the CSI-RS 502, the UE may generate a source CSI report based on the CSI-RS 502. The base station may further transmit a PDSCH, such as an SPS occasion 504A, to the UE. The UE may transmit a HARQ feedback in PUCCH 506A to the base station. In each cycle of P/SP CSI-RS, the UE may compute/determine the CSI difference between the source CSI report and the target CSI report (i.e., the CSI based on P/SP CSI-RS and each SPS occasion). The UE may report the CSI difference per SPS occasion at the end of the cycle with a UL resource that is the same or different from that carrying HARQ feedback. The UE may also report the statistics of CSI difference per SPS occasion computed over multiple P/SP CSI-RS cycles. In the example illustrated in FIG. 5, the UE may receive additional PDSCH in SPS occasion 504N and transmit HARQ feedback in PUCCH 506N. The UE may transmit the CSI difference report to report statistics of CSI difference for SPS occasions 504A and 504N, and any SPS occasions between SPS occasions 504A and 504N in PUCCH 508 that is separate from the PUCCH 506N carrying the HARQ feedback.

Figure 6:
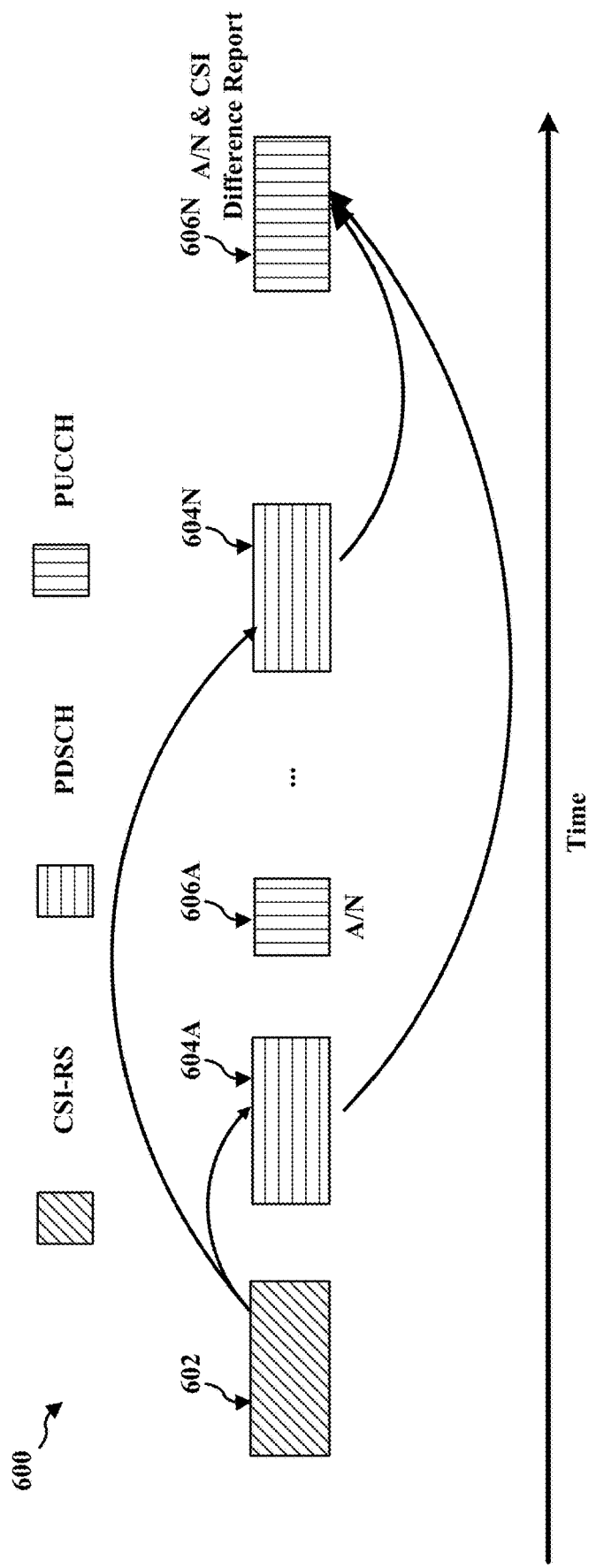
FIG. 6 illustrates an example communication between a base station and a UE.

FIG. 6 illustrates an example communication 600 for transmitting CSI difference reports. As illustrated in FIG. 6, CSI-RS 602 such as P/SP CSI-RS may be transmitted from a base station to a UE. Upon receiving the CSI-RS 602, the UE may generate a source CSI report based on the CSI-RS 602. The base station may further transmit a PDSCH, such as an SPS occasion 604A, to the UE. The UE may transmit a HARQ feedback in PUCCH 606A to the base station. In each cycle of P/SP CSI-RS, the UE may compute/determine the CSI difference between the source CSI report and the target CSI report (i.e., the CSI based on P/SP CSI-RS and each SPS occasion). The UE may report the CSI difference per SPS occasion at the end of the cycle with a UL resource same or different from that carrying HARQ feedback. The UE may also report the statistics of CSI difference per SPS occasion computed over multiple P/SP CSI-RS cycles. In the example illustrated in FIG. 6, the UE may receive additional PDSCH transmissions in SPS occasion 604N and transmit HARQ feedback in PUCCH 606N. The UE may transmit the CSI difference report to report statistics of CSI difference for SPS occasions 604A and 604N, and any SPS occasions between SPS occasions 604A and 604N in PUCCH 606N that carries the HARQ feedback for SPS occasion 604N.

As noted above, a difference in CSI may correspond to a difference in MCS, and the difference may be referred to as a delta. Thus, in some aspects, the CSI difference report may be a delta-MCS report indicating a difference in MCS. For example, the report may be for a TB received with MCS index $I_{MCS}$ provided in the table 3 above. The delta-MCS may be calculated from the difference between $I_{MCS\_tgt}$ and $I_{MCS}$, where $I_{MCS\_tgt}$ is a largest MCS index such that estimated block error rate (BLER) for a TB received with the MCS index may be smaller than or equal to a BLER target, and $I_{MCS}$ is the MCS index of the received TB.

Figure 7:
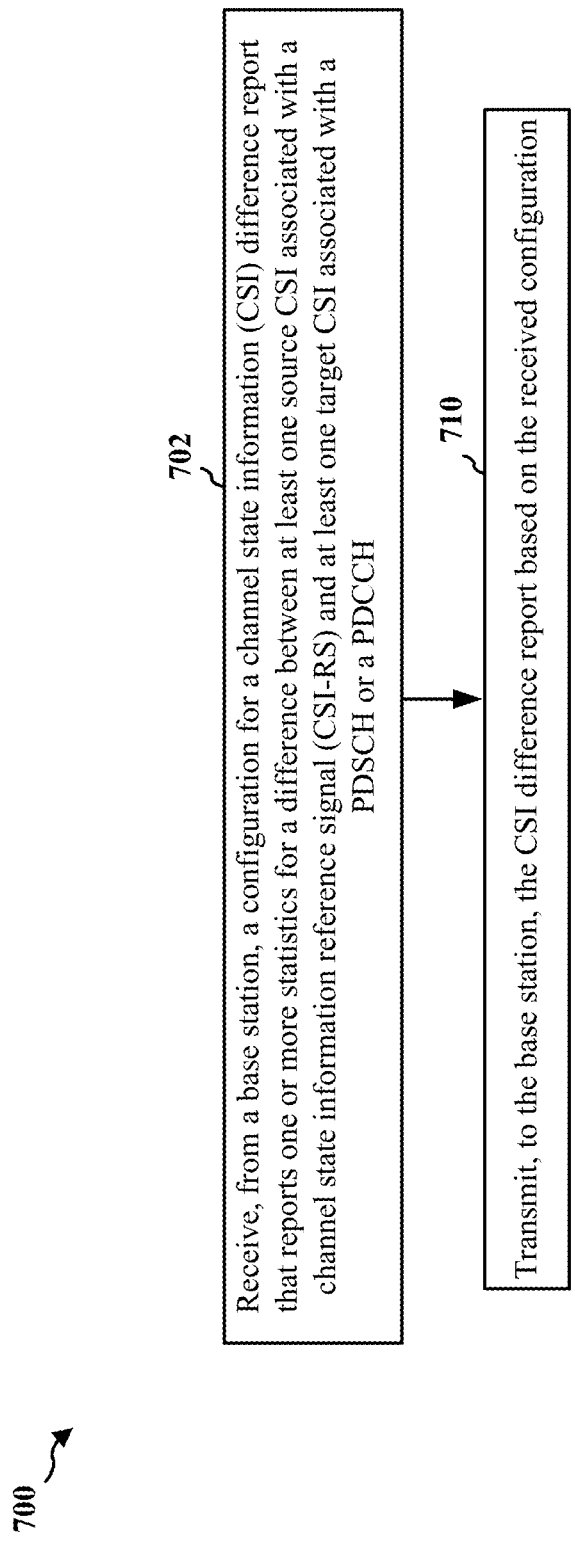
FIG. 7 is a flowchart of a method of wireless communication at a UE.

FIG. 7 is a flowchart 700 of a method of wireless communication. In some examples, the method may be performed by a UE (e.g., the UE 104, the UE 402; the apparatus 902). The method may help to provide a base station with more up-to-date CSI information which may be used to improve the communication between the base station and the UE.

At 702, the UE receives, from a base station, a configuration for a CSI difference report that reports one or more statistics for a difference between at least one source CSI associated with a CSI-RS and at least one target CSI associated with a PDSCH or a PDCCH. For example, the reception may be performed by the configuration reception component 940 in FIG. 9. For example, the UE 402 may receive from a base station 404, a configuration for a CSI difference report that reports one or more statistics for a difference between at least one source CSI associated with a CSI-RS and at least one target CSI associated with a PDSCH or a PDCCH. In some aspects, the PDSCH is a DG PDSCH or an SPS PDSCH. In some aspects, the configuration further includes a set of triggering conditions for transmitting the CSI difference report. In some aspects, the set of triggering conditions includes a CQI difference threshold between the at least one target CSI and the at least one source CSI or a CQI statistics threshold based on the one or more statistics for the at least one target CSI and the at least one source CSI. In some aspects, the one or more statistics includes one or more of: a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI.

At 710, the UE transmits, to the base station, the CSI difference report based on the received configuration. For example, the transmission may be performed by CSI difference reporting component 946 in FIG. 9. For example, the transmission may correspond to the CSI difference report on PUCCH/PUSCH 414A/414B in FIG. 4, PUCCH 508 in FIG. 5, PUCCH 606N in FIG. 6, or the like. For example, the UE 402 may transmit, to the base station 404, the CSI difference report based on the received configuration on PUCCH/PUSCH 414A/414B in FIG. 4. In some aspects, the UE transmits (reports) the CSI difference report on an uplink resource that does not carry the HARQ feedback. In some aspects, the CSI difference report is configured to be reported on a first uplink resource that is configured for the CSI difference report or a second uplink resource that is configured for a different known uplink transmission. In some aspects, the CSI difference report is reported in a MAC-CE on the second uplink resource that is configured for a PUCCH. In some aspects, the CSI difference report further comprises one or more CSI metrics including one or more of an RSRP difference metric, an SINR difference metric, an RSRQ difference metric, or an RI difference metric. In some aspects, the one or more CSI metrics are configured as a wideband CSI metric. In some aspects, the one or more CSI metrics are configured as a subband CSI metric in a BWP. In some aspects, the UE may start a timer after transmitting the CSI difference report may refrain from transmitting another CSI difference report until the timer expires. In some aspects, the configuration configures the UE to report the CSI difference report without reporting the at least one source CSI and the at least one target CSI.

Figure 8:
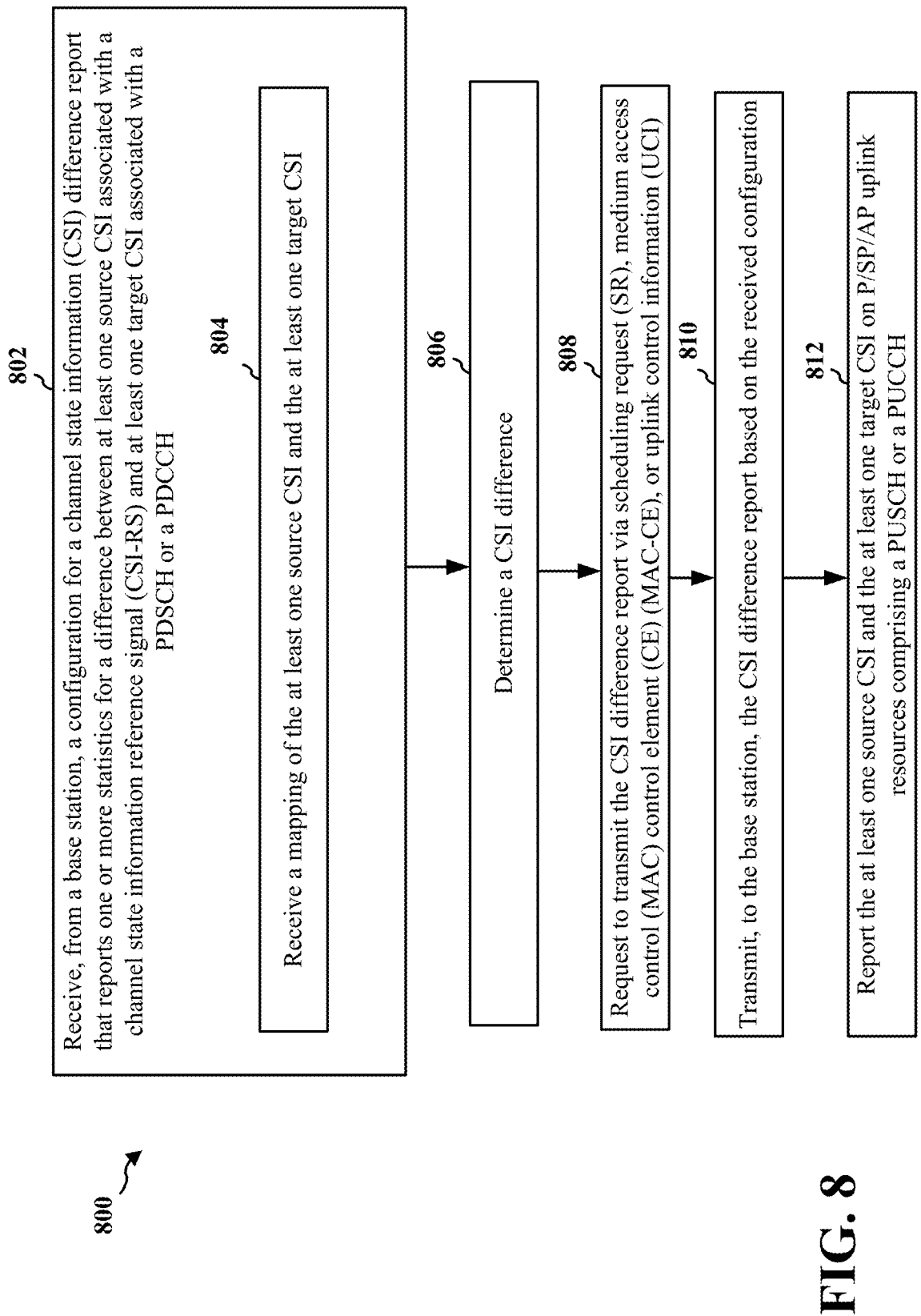
FIG. 8 is a flowchart of a method of wireless communication at a UE.

FIG. 8 is a flowchart 800 of a method of wireless communication. In some examples, the method may be performed by a UE (e.g., the UE 104, the UE 402; the apparatus 902). The method may help to provide a base station with more up-to-date CSI information which may be used to improve the communication between the base station and the UE.

At 802, the UE receives, from a base station, a configuration for a CSI difference report that reports one or more statistics for a difference between at least one source CSI associated with a CSI-RS and at least one target CSI associated with a PDSCH or a PDCCH. For example, the reception may be performed by the configuration reception component 940 in FIG. 9. For example, the UE 402 may receive from a base station 404, a configuration for a CSI difference report that reports one or more statistics for a difference between at least one source CSI associated with a CSI-RS and at least one target CSI associated with a PDSCH or a PDCCH. In some aspects, the PDSCH is a DG PDSCH or an SPS PDSCH. In some aspects, the configuration further includes a set of triggering conditions for transmitting the CSI difference report. In some aspects, the set of triggering conditions includes a CQI difference threshold between the at least one target CSI and the at least one source CSI or a CQI statistics threshold based on the one or more statistics for the at least one target CSI and the at least one source CSI. In some aspects, the one or more statistics includes one or more of: a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI.

In some aspects, at 804, the UE receives a mapping of the at least one source CSI and the at least one target CSI. For example, the UE 402 may receive a mapping of the at least one source CSI and the at least one target CSI. In some aspects, the mapping may be received via MAC-CE. In some aspects, the mapping may be received via DCI. In some aspects, the mapping may be received via RRC signaling.

In some aspects, at 806, the UE determines a CSI difference. For example, the determination may be performed by CSI difference determination component 942 in FIG. 9. In some aspects, the UE may determine a CSI difference including a CQI difference per SPS occasion when the PDSCH is an SPS PDSCH. In some aspects, to determine the CSI difference, the UE measures at least one source CSI based on the CSI-RS. The CSI-RS may be one of an A/SP/AP CSI-RS. In some aspects, the at least one target CSI is measured based on a DM-RS associated with the PDSCH or the PDCCH.

In some aspects, at 808, the UE dynamically requests to transmit a CSI difference report via SR, MAC-CE, or UCI. For example, the request may be performed by transmission request component 944 in FIG. 9. For example, the request may correspond to request 412A in FIG. 4. For example, the UE 402 may dynamically request (by transmitting request 412A) to transmit a CSI difference report via SR, MAC-CE, or UCI. In some aspects, the UE transmits (reports) the CSI difference report on P/SP/AP uplink resources including a PUSCH or a PUCCH. In some aspects, the UE transmits (reports) the CSI difference report on an uplink resource that carries HARQ feedback including an acknowledgment (ACK) or negative ACK (NACK).

At 810, the UE transmits, to the base station, the CSI difference report based on the received configuration. For example, the transmission may be performed by CSI difference reporting component 946 in FIG. 9. For example, the transmission may correspond to the CSI difference report on PUCCH/PUSCH 414A/414B in FIG. 4, PUCCH 508 in FIG. 5, PUCCH 606N in FIG. 6, or the like. For example, the UE 402 may transmit, to the base station 404, the CSI difference report based on the received configuration on PUCCH/PUSCH 414A/414B in FIG. 4. In some aspects, the UE transmits (reports) the CSI difference report on an uplink resource that does not carry the HARQ feedback. In some aspects, the CSI difference report is configured to be reported on a first uplink resource that is configured for the CSI difference report or a second uplink resource that is configured for a different known uplink transmission. In some aspects, the CSI difference report is reported in a MAC-CE on the second uplink resource that is configured for a PUCCH. In some aspects, the CSI difference report further comprises one or more CSI metrics including one or more of an RSRP difference metric, an SINR difference metric, an RSRQ difference metric, or an RI difference metric. In some aspects, the one or more CSI metrics are configured as a wideband CSI metric. In some aspects, the one or more CSI metrics are configured as a subband CSI metric in a BWP. In some aspects, the UE may start a timer after transmitting the CSI difference report may refrain from transmitting another CSI difference report until the timer expires. In some aspects, the configuration configures the UE to report the CSI difference report without reporting the at least one source CSI and the at least one target CSI.

At 812, the UE reports the at least one source CSI and the at least one target CSI on P/SP/AP uplink resources including a PUSCH or a PUCCH. For example, the reporting may be performed by CSI reporting component 948 in FIG. 9. For example, the reporting may correspond to source CSI report and target CSI report on PUCCH/PUSCH 416A in FIG. 4. For example, the UE 402 may report the at least one source CSI and the at least one target CSI on P/SP/AP uplink resources including a PUSCH or a PUCCH such as the PUCCH/PUSCH 416A in FIG. 4.

Figure 9:
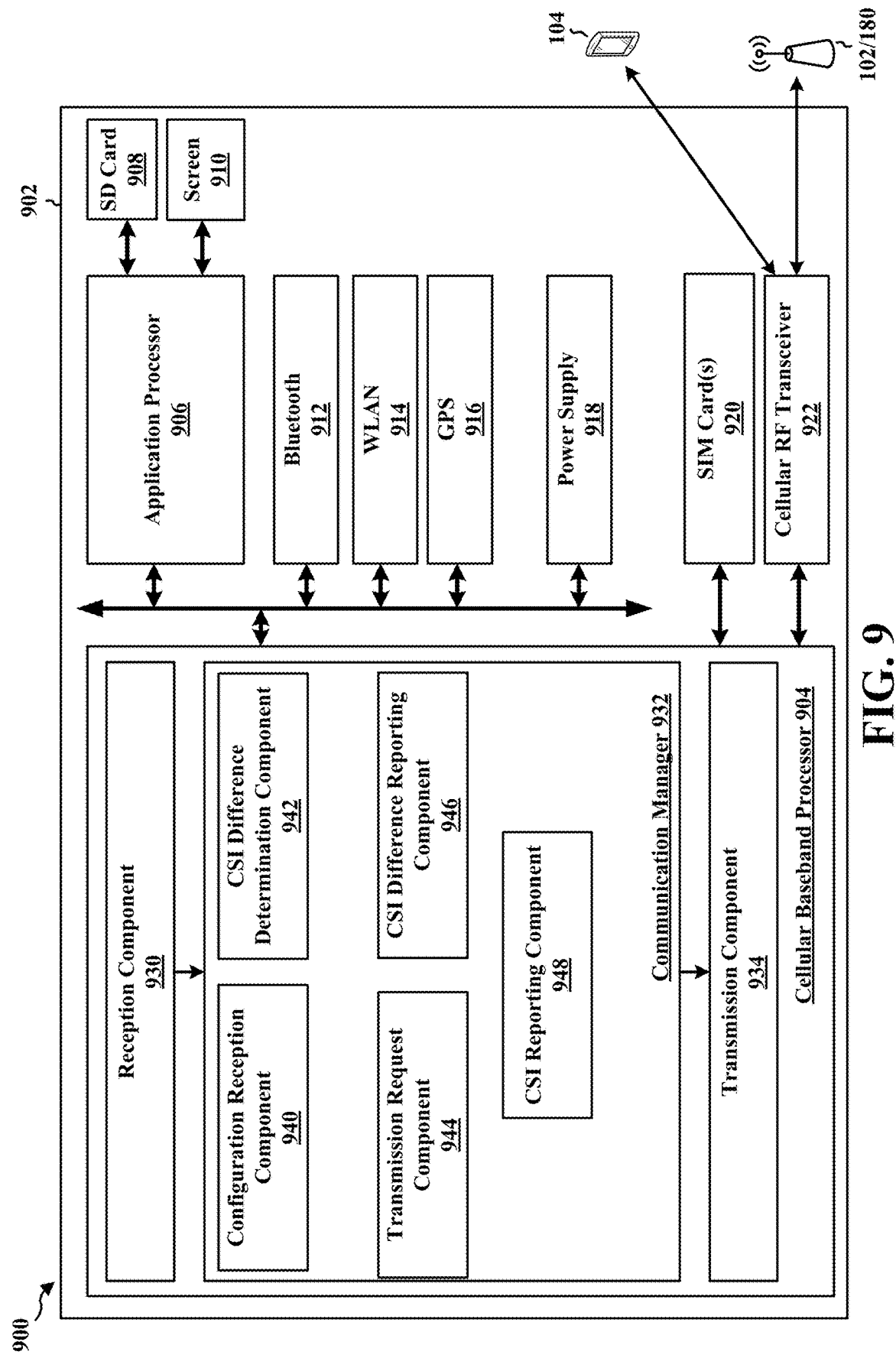
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a configuration reception component 940 that is configured to receive, from a base station, a configuration for a CSI difference report that reports one or more statistics for a difference between at least one source CSI associated with a CSI-RS and at least one target CSI associated with a PDSCH, e.g., as described in connection with 702 in FIG. 7 or 802 in FIG. 8. The communication manager 932 further includes a CSI difference determination component 942 that is configured to determine a CSI difference, e.g., as described in connection with 806 in FIG. 8. The communication manager 932 further includes a transmission request component 944 that is configured to dynamically requests to transmit a CSI difference report via SR, MAC-CE, or UCI, e.g., as described in connection with 808 in FIG. 8. The communication manager 932 further includes a CSI difference reporting component 946 that is configured to transmit, to the base station, the CSI difference report based on the received configuration, e.g., as described in connection with 710 in FIG. 7 or 810 in FIG. 8. The communication manager 932 further includes a CSI reporting component 948 that is configured to report the at least one source CSI and the at least one target CSI on P/SP/AP uplink resources including a PUSCH or a PUCCH, e.g., as described in connection with 812 in FIG. 8.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a configuration for a CSI difference report that reports one or more statistics for a difference between at least one source CSI associated with CSI-RS and at least one target CSI associated with a PDSCH (e.g., the configuration reception component 940 of the communication manager 932 comprised in the cellular baseband processor 904 and/or a transceiver). The cellular baseband processor 904 may further include means for transmitting, to the base station, the CSI difference report based on the received configuration (e.g., the CSI difference reporting component 946 of the communication manager 932 comprised in the cellular baseband processor 904 and/or a transceiver). The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
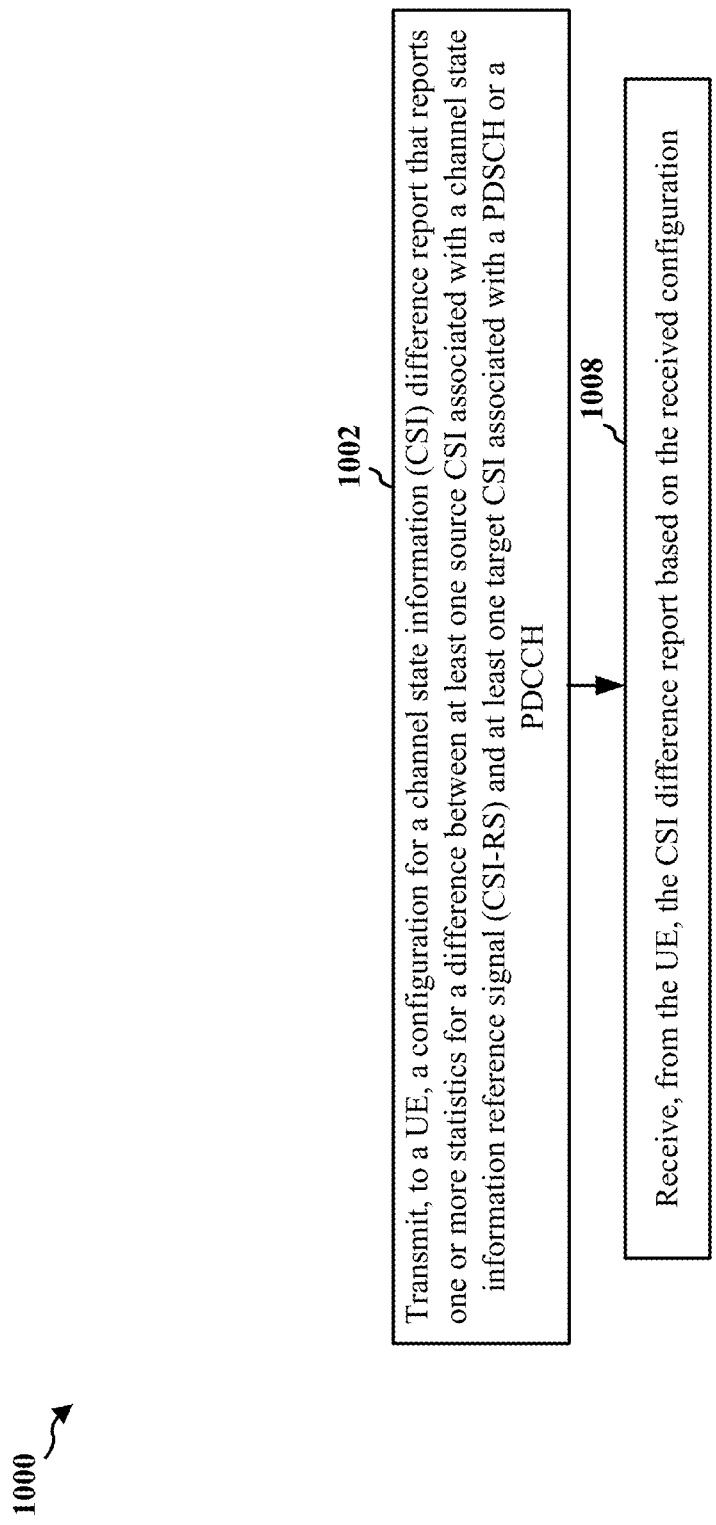
FIG. 10 is a flowchart of a method of wireless communication at a base station.

FIG. 10 is a flowchart 1000 of a method of wireless communication. In some examples, the method may be performed by a base station (e.g., the base station 102/180, the base station 404; the apparatus 1202). The method may help to provide a base station with more up-to-date CSI information which may be used to improve the communication between the base station and the UE.

At 1002, the base station transmits, to a UE, a configuration for a CSI difference report that reports one or more statistics for a difference between at least one source CSI associated with a CSI-RS and at least one target CSI associated with a PDSCH or a PDCCH. For example, the transmission may be performed by configuration transmission component 1242 in FIG. 12. For example, the transmission may correspond to RRC connection 406 in FIG. 4. For example, the base station may 404 may transmit, to a UE 402, a configuration for a CSI difference report that reports one or more statistics for a difference between at least one source CSI associated with a CSI-RS and at least one target CSI associated with a PDSCH or a PDCCH upon RRC connection 406 in FIG. 4. In some aspects, the PDSCH is a DG PDSCH or an SPS PDSCH. In some aspects, the configuration further includes a set of triggering conditions for transmitting the CSI difference report. In some aspects, the set of triggering conditions includes a CQI difference threshold between the at least one target CSI and the at least one source CSI or a CQI statistics threshold based on the one or more statistics for the at least one target CSI and the at least one source CSI. In some aspects, the one or more statistics includes one or more of: a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI. In some aspects, the base station may configure the CSI difference report to be reported on P/SP/AP uplink resources including a PUCCH/PUSCH. In some aspects, the base station further configures the at least one source CSI and the at least one target CSI to be reported P/SP/AP uplink resources including a PUSCH/PUCCH. In some aspects, the base station further configures the UE to report the CSI difference report without reporting the at least one source CSI and the at least one target CSI. In some aspects, the base station further configures the CSI difference report to be reported on P/SP/AP uplink resources including a PUSCH/PUCCH. In some aspects, the base station further configures the CSI difference report to be reported on an uplink resource that carries HARQ feedback including ACK/NACK. In some aspects, the base station further configures the CSI difference report to be reported on an uplink resource that does not carry HARQ feedback including ACK/NACK. In some aspects, the base station further configures the CSI difference report to be reported on a first uplink resource that is configured for the CSI difference report or a second uplink resource that is configured for a different known uplink transmission. In some aspects, the configuration configures the UE to report the CSI difference report without reporting the at least one source CSI and the at least one target CSI. In some aspects, the at least one source CSI comprises measurements on the CSI-RS. The CSI-RS may be one of an A/SP/AP CSI-RS. In some aspects, the at least one target CSI is measured based on a DM-RS associated with the PDSCH or the PDCCH.

At 1008, the base station receives the CSI difference report from the UE. For example, the reception may be performed by CSI difference report reception component 1246 in FIG. 12. For example, the reception may correspond to the CSI difference report on PUCCH/PUSCH 414A/414B in FIG. 4, PUCCH 508 in FIG. 5, PUCCH 606N in FIG. 6, or the like. For example, the base station 404 may receive the CSI difference report from the UE 402 on PUCCH/PUSCH 414A/414B in FIG. 4, PUCCH 508 in FIG. 5, PUCCH 606N in FIG. 6, or the like. In some aspects, the base station receives the CSI difference report on an uplink resource that does not carry the HARQ feedback. In some aspects, the base station may configure the CSI difference report to be reported on a first uplink resource that is configured for the CSI difference report or a second uplink resource that is configured for a different known uplink transmission. In some aspects, the base station may request receiving the CSI difference report via SR, MAC-CE, or UCI. In some aspects, the CSI difference report is received in a MAC-CE on the second uplink resource that is configured for a PUCCH. In some aspects, the CSI difference report further includes one or more CSI metrics including one or more of an RSRP difference metric, an SINR difference metric, an RSRQ difference metric, or an RI difference metric. In some aspects, the one or more CSI metrics are configured as a wideband CSI metric. In some aspects, the one or more CSI metrics are configured as a subband CSI metric in a BWP.

Figure 11:
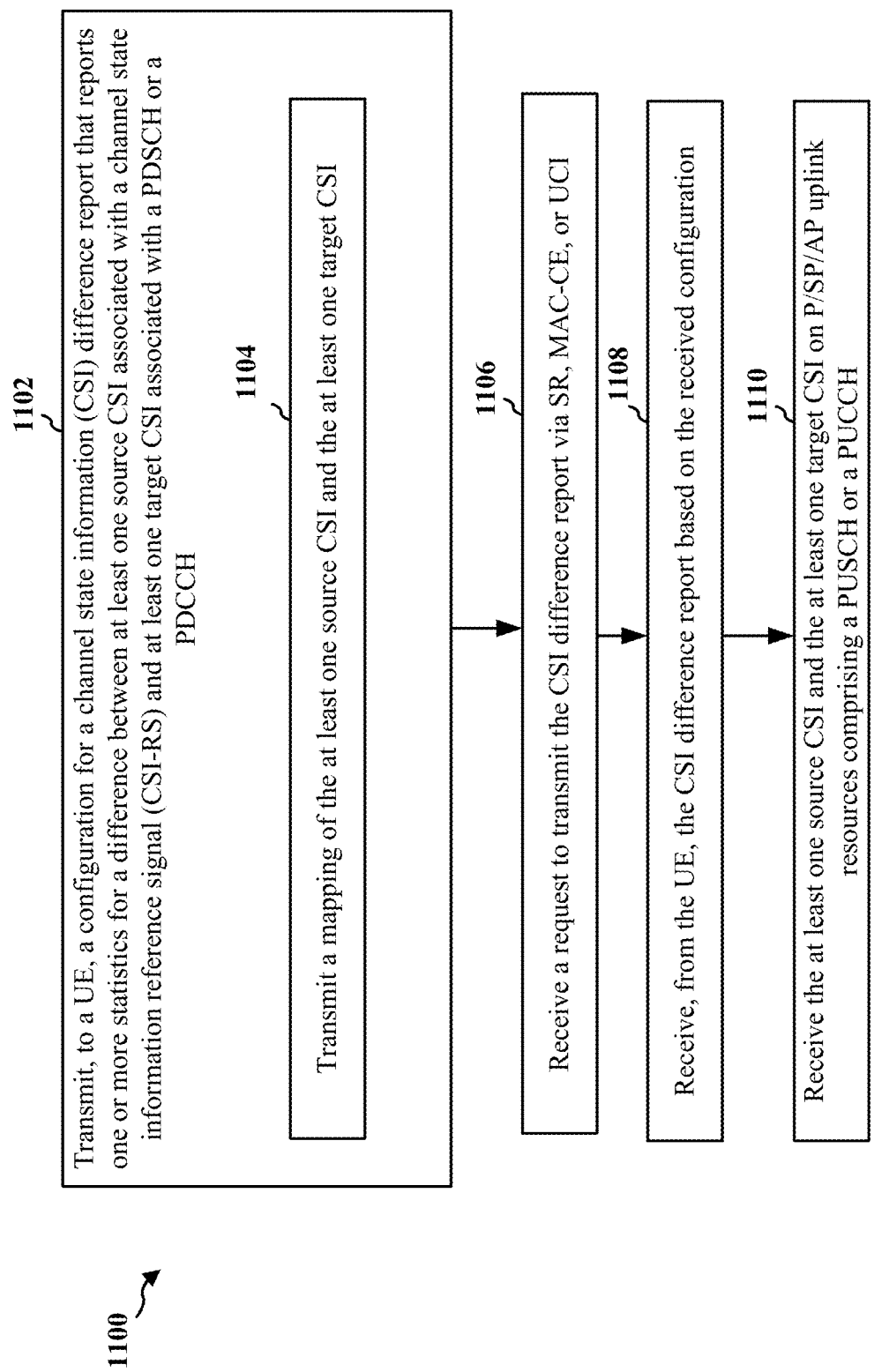
FIG. 11 is a flowchart of a method of wireless communication at a base station.

FIG. 11 is a flowchart 1100 of a method of wireless communication. In some examples, the method may be performed by a base station (e.g., the base station 112/180, the base station 404; the apparatus 1202). The method may help to provide a base station with more up-to-date CSI information which may be used to improve the communication between the base station and the UE.

At 1102, the base station transmits, to a UE, a configuration for a CSI difference report that reports one or more statistics for a difference between at least one source CSI associated with a CSI-RS and at least one target CSI associated with a PDSCH or a PDCCH. For example, the transmission may be performed by configuration transmission component 1242 in FIG. 12. For example, the transmission may correspond to RRC connection 406 in FIG. 4. For example, the base station may 404 may transmit, to a UE 402, a configuration for a CSI difference report that reports one or more statistics for a difference between at least one source CSI associated with a CSI-RS and at least one target CSI associated with a PDSCH or a PDCCH upon RRC connection 406 in FIG. 4. In some aspects, the PDSCH is a DG PDSCH or an SPS PDSCH. In some aspects, the configuration further includes a set of triggering conditions for transmitting the CSI difference report. In some aspects, the set of triggering conditions includes a CQI difference threshold between the at least one target CSI and the at least one source CSI or a CQI statistics threshold based on the one or more statistics for the at least one target CSI and the at least one source CSI. In some aspects, the one or more statistics includes one or more of: a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI. In some aspects, the base station may configure the CSI difference report to be reported on P/SP/AP uplink resources including a PUCCH/PUSCH. In some aspects, the base station further configures the at least one source CSI and the at least one target CSI to be reported P/SP/AP uplink resources including a PUSCH/PUCCH. In some aspects, the base station further configures the UE to report the CSI difference report without reporting the at least one source CSI and the at least one target CSI. In some aspects, the base station further configures the CSI difference report to be reported on P/SP/AP uplink resources including a PUSCH/PUCCH. In some aspects, the base station further configures the CSI difference report to be reported on an uplink resource that carries HARQ feedback including ACK/NACK. In some aspects, the base station further configures the CSI difference report to be reported on an uplink resource that does not carry HARQ feedback including ACK/NACK. In some aspects, the base station further configures the CSI difference report to be reported on a first uplink resource that is configured for the CSI difference report or a second uplink resource that is configured for a different known uplink transmission. In some aspects, the configuration configures the UE to report the CSI difference report without reporting the at least one source CSI and the at least one target CSI. In some aspects, the at least one source CSI comprises measurements on the CSI-RS. The CSI-RS may be one of an A/SP/AP CSI-RS. In some aspects, the at least one target CSI is measured based on a DM-RS associated with the PDSCH or the PDCCH.

In some aspects, at 1104, the base station transmits a mapping of the at least one source CSI and the at least one target CSI. For example, the base station 404 may transmit a mapping of the at least one source CSI and the at least one target CSI. In some aspects, the mapping may be transmitted via MAC-CE. In some aspects, the mapping may be transmitted via DCI. In some aspects, the mapping may be transmitted via RRC signaling.

In some aspects, at 1106, the base station receives a dynamic request to transmit a CSI difference report via SR, MAC-CE, or UCI. For example, the request may be performed by transmission request component 1244 in FIG. 12. For example, the request may correspond to request 412A in FIG. 4. For example, the base station 404 may receive a request 412A to transmit a CSI difference report via SR, MAC-CE, or UCI. In some aspects, the UE transmits (reports) the CSI difference report on P/SP/AP uplink resources including a PUSCH or a PUCCH. In some aspects, the base station receives the CSI difference report on an uplink resource that carries a HARQ feedback including an acknowledgment (ACK) or negative ACK (NACK).

At 1108, the base station receives the CSI difference report from the UE. For example, the reception may be performed by CSI difference report reception component 1246 in FIG. 12. For example, the reception may correspond to the CSI difference report on PUCCH/PUSCH 414A/414B in FIG. 4, PUCCH 508 in FIG. 5, PUCCH 606N in FIG. 6, or the like. For example, the base station 404 may receive the CSI difference report from the UE 402 on PUCCH/PUSCH 414A/414B in FIG. 4, PUCCH 508 in FIG. 5, PUCCH 606N in FIG. 6, or the like. In some aspects, the base station receives the CSI difference report on an uplink resource that does not carry the HARQ feedback. In some aspects, the base station may configure the CSI difference report to be reported on a first uplink resource that is configured for the CSI difference report or a second uplink resource that is configured for a different known uplink transmission. In some aspects, the base station may request receiving the CSI difference report via SR, MAC-CE, or UCI. In some aspects, the CSI difference report is received in a MAC-CE on the second uplink resource that is configured for a PUCCH. In some aspects, the CSI difference report further includes one or more CSI metrics including one or more of an RSRP difference metric, an SINR difference metric, an RSRQ difference metric, or an RI difference metric. In some aspects, the one or more CSI metrics are configured as a wideband CSI metric. In some aspects, the one or more CSI metrics are configured as a subband CSI metric in a BWP.

At 1110, the base station receives the at least one source CSI and the at least one target QI on P/SP/AP uplink resources including a PUSCH or a PUCCH. For example, the reporting may be performed by CSI report reception component 1248 in FIG. 12. For example, the reception may correspond to the source CSI report and target CSI report on PUCCH/PUSCH 416A in FIG. 4. For example, the base station 404 may receive the at least one source CSI and the at least one target QI on P/SP/AP uplink resources including a PUSCH or a PUCCH such as PUCCH/PUSCH 416A in FIG. 4.

Figure 12:
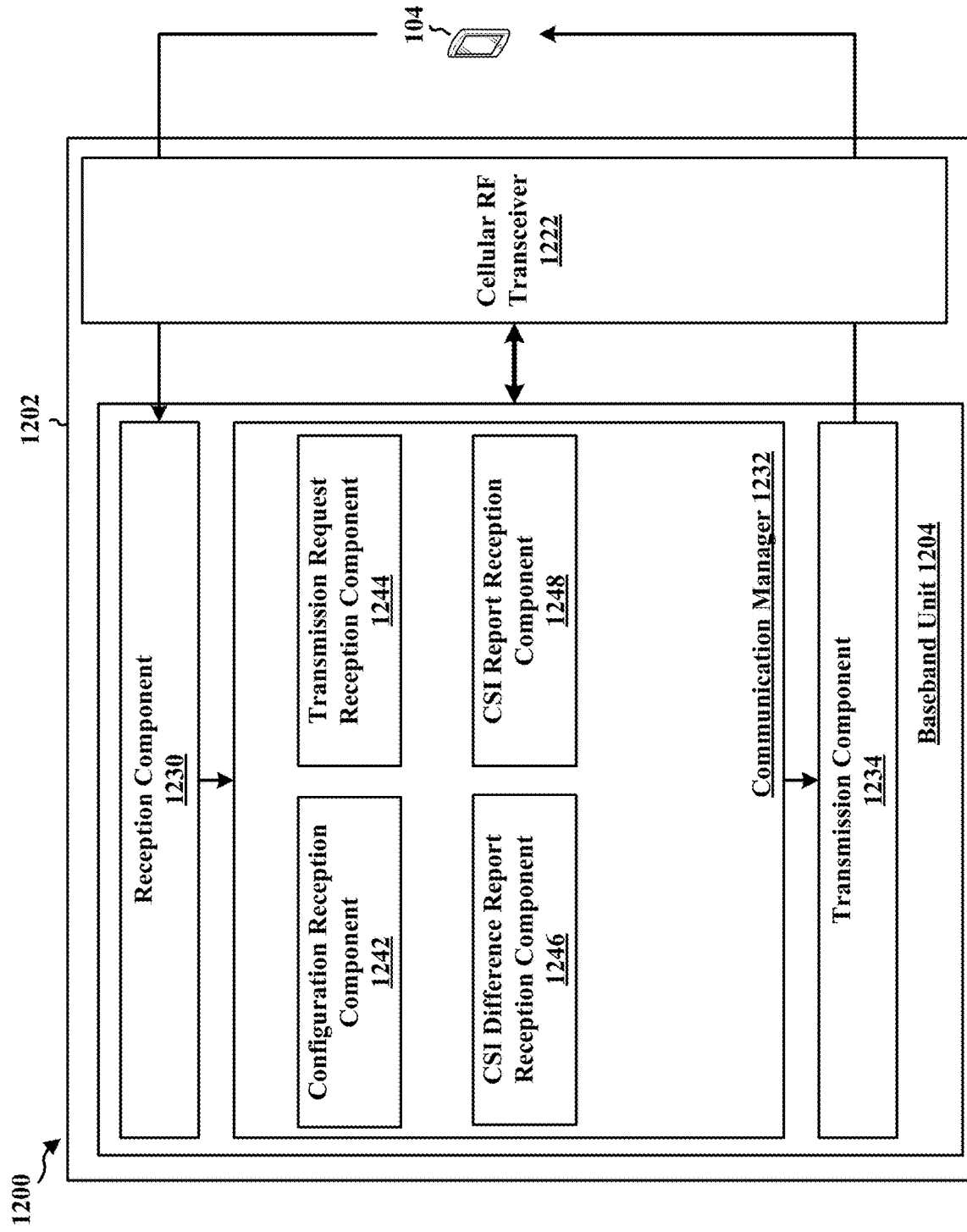
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 310 and may include the memory 376 and/or at least one of the TX processor 316, the RX processor 370, and the controller/processor 375.

The communication manager 1232 includes a configuration transmission component 1242 that transmits, to a UE, a configuration for a CSI difference report that reports one or more statistics for a difference between at least one source CSI associated with a CSI-RS and at least one target CSI associated with a PDSCH, e.g., as described in connection with 1002 in FIGS. 10 and 1102 in FIG. 11. The communication manager 1232 further includes a component 1244 that receives a dynamic request to transmit a CSI difference report via SR, MAC-CE, or UCI, e.g., as described in connection with 1106 in FIG. 11. The communication manager 1232 further includes a component 1246 that receives the CSI difference report from the UE, e.g., as described in connection with 1008 in FIGS. 10 and 1108 in FIG. 11. The communication manager 1232 further includes a component 1248 that receives the at least one source CSI and the at least one target QI on P/SP/AP uplink resources including a PUSCH or a PUCCH, e.g., as described in connection with 1110 in FIG. 11.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for transmitting, to a UE, a configuration for a CSI difference report that reports one or more statistics for a difference between at least one source CSI associated with a CSI-RS and at least one target CSI associated with a PDSCH (e.g., the configuration transmission component 1242 of the communication manager 1232 comprised in the baseband unit 1204 and/or a transceiver). The baseband unit 1204 further includes means for receiving the CSI difference report from the UE (e.g., the CSI difference report reception component 1246 of the communication manager 1232 comprised in the baseband unit 1204 and/or a transceiver).

The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

The following examples are illustrative only and may be combined with aspects of other examples or teachings described herein, without limitation.

Example 1 is method of wireless communication of a UE. The method includes receiving, from a base station, a configuration for a CSI difference report that reports one or more statistics for a difference between at least one source CSI associated with a CSI-RS and at least one target CSI associated with a PDSCH or a PDCCH. The method further includes transmitting, to the base station, the CSI difference report based on the received configuration.

Example 2 is the method of example 1 where the at least one source CSI is measured based on the CSI-RS, and where the CSI-RS is one of a P/SP/AP CSI-RS.

Example 3 is the method of examples 1-2 where the at least one target CSI is measured based on a DM-RS associated with the PDSCH or the PDCCH.

Example 4 is the method of examples 1-3 where the PDSCH is a DG PDSCH or a SPS PDSCH.

Example 5 is the method of examples 1-4 that further includes reporting the at least one source CSI and the at least one target CSI on P/SP/AP uplink resources including a PUSCH or a PUCCH.

Example 6 is the method of examples 1-5 where the configuration configures the UE to report the CSI difference report without reporting the at least one source CSI and the at least one target CSI.

Example 7 is the method of examples 1-6 that further includes receiving a mapping of the at least one source CSI and the at least one target CSI via RRC signaling.

Example 8 is the method of examples 1-7 that further includes receiving a mapping of the at least one source CSI and the at least one target CSI via MAC-CE.

Example 9 is the method of examples 1-8 that further includes receiving a mapping of the at least one source CSI and the at least one target CSI via DCI.

Example 10 is the method of examples 1-9 where the UE reports the CSI difference report on P/SP/AP uplink resources including a PUSCH or a PUCCH.

Example 11 is the method of examples 1-10 where the UE reports the CSI difference on an uplink resource that carries a HARQ feedback including an ACK or NACK.

Example 12 is the method of examples 1-10 where the UE reports the CSI difference on an uplink resource that does not carry a HARQ feedback including an ACK or NACK.

Example 13 is the method of examples 1-12 where the one or more statistics include one or more of: a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI.

Example 14 is the method of examples 1-13 where the configuration further includes a set of triggering conditions for transmitting the CSI difference report and where the set of triggering conditions comprises a CQI difference threshold between the at least one target CSI and the at least one source CSI or a CQI statistics threshold based on the one or more statistics for the at least one target CSI and the at least one source CSI.

Example 15 is the method of examples 1-14 where the CSI difference report is configured to be reported on a first uplink resource that is configured for the CSI difference report or a second uplink resource that is configured for a different known uplink transmission.

Example 16 is the method of examples 1-15 where the CSI difference report is reported in a MAC-CE on the second uplink resource that is configured for a PUCCH.

Example 17 is the method of examples 1-16 that further includes dynamically requesting the first uplink resource in a SR or a UCI bit transmitted together with a HARQ feedback.

Example 18 is the method of examples 1-17 that further includes requesting to transmit the CSI difference report via SR, MAC-CE, or UCI.

Example 19 is the method of examples 1-18 that further includes starting a timer after transmitting the CSI difference report and refraining from transmitting another CSI difference report until the timer expires.

Example 20 is the method of examples 1-19 where the CSI difference report further comprises one or more CSI metrics including one or more of a CQI difference metric, a RSRP difference metric, a SINR difference metric, a RSRQ difference metric, or a RI difference metric.

Example 21 is the method of examples 1-20 where the one or more CSI metrics are configured as a wideband CSI metric.

Example 22 is the method of examples 1-21 where the one or more CSI metrics are configured as a subband CSI metric in a BWP.

Example 23 is the method of examples 1-22 that further includes determining a CQI difference per SPS occasion.

Example 24 is a method of wireless communication of a base station. The method includes transmitting, to a UE, a configuration comprising a set of triggering conditions for transmitting a CSI difference report that reports one or more statistics for at least one source CSI associated with a CSI-RS and at least one target CSI associated with a PDSCH or a PDCCH. The method further includes receiving the CSI difference report from the UE.

Example 25 is the method of example 24 where the at least one source CSI includes measurements on the CSI-RS, and where the CSI-RS is one of a P/SP/AP CSI-RS.

Example 26 is the method of examples 24-25 where the at least one target CSI comprises measurements on a DM-RS associated with the PDSCH or the PDCCH.

Example 27 is the method of examples 24-26 where the PDSCH is a DG PDSCH or a SPS PDSCH.

Example 28 is the method of examples 24-27 that further includes configuring the at least one source CSI and the at least one target CSI to be reported on P/SP/AP uplink resources including a PUSCH or a PUCCH.

Example 29 is the method of examples 24-28 that further includes configuring the UE to report the CSI difference report without reporting the at least one source CSI and the at least one target CSI.

Example 30 is the method of examples 24-29 that further includes transmitting a mapping of the at least one source CSI and the at least one target CSI via RRC signaling.

Example 31 is the method of examples 24-30 that further includes transmitting a mapping of the at least one source CSI and the at least one target CSI via MAC-CE.

Example 32 is the method of examples 24-31 that further includes transmitting a mapping of the at least one source CSI and the at least one target CSI via DCI.

Example 33 is the method of examples 24-32 that further includes configuring the CSI difference report to be reported on P/SP/AP uplink resources including a PUSCH or a PUCCH.

Example 34 is the method of examples 24-33 that further includes configuring the CSI difference report to be reported on an uplink resource that carries a HARQ feedback including an ACK or NACK.

Example 35 is the method of examples 24-33 that further includes configuring the CSI difference report to be reported on an uplink resource that does not carry a HARQ feedback including an ACK or NACK.

Example 36 is the method of examples 24-35 where the one or more statistics comprises one or more of a difference between the at least one target CSI and the at least one source CSI, a minimum difference between the at least one target CSI and the at least one source CSI, a maximum difference between the at least one target CSI and the at least one source CSI, an average difference between the at least one target CSI and the at least one source CSI, a histogram for one or more differences between the at least one target CSI and the at least one source CSI, or a percentile statistic for one or more differences between the at least one target CSI and the at least one source CSI.

Example 37 is the method of examples 24-36 where the configuration further includes a set of triggering conditions for transmitting the CSI difference report, wherein the set of triggering conditions comprises a CQI difference threshold between the at least one target CSI and the at least one source CSI or a CQI statistics threshold based on the one or more statistics for the at least one target CSI and the at least one source CSI.

Example 38 is the method of examples 24-37 that further includes configuring the CSI difference report to be reported on a first uplink resource that is configured for the CSI difference report or a second uplink resource that is configured for a different known uplink transmission.

Example 39 is the method of examples 24-38 where the CSI difference report is received in a MAC-CE on the second uplink resource that is configured for a PUCCH.

Example 40 is the method of examples 24-39 that further includes receiving a dynamic request in the first uplink resource in a SR or an UCI bit received together with a HARQ feedback.

Example 41 is the method of examples 24-40 that further includes receiving the CSI difference report via SR, MAC-CE, or UCI.

Example 42 is the method of examples 24-41 where the CSI difference report further comprises one or more CSI metrics including one or more of a CQI difference metric, a RSRP difference metric, a SINR difference metric, a RSRQ difference metric, or a RI difference metric.

Example 43 is the method of examples 24-42 where the one or more CSI metrics are configured as a wideband CSI metric.

Example 44 is the method of examples 24-43 where the one or more CSI metrics are configured as a subband CSI metric in a BWP.

Example 45 is an apparatus for wireless communication of a UE including a memory and a at least one processor coupled to the memory and configured to perform the method of examples 1-23.

Example 46 is an apparatus for wireless communication of a base station including a memory and a at least one processor coupled to the memory and configured to perform the method of examples 24-44.

Example 47 is an apparatus for wireless communication of a UE including means for performing the method of examples 1-23.

Example 48 is an apparatus for wireless communication of a base station including means for performing the method of examples 24-44.

Example 49 is computer-readable medium storing computer executable code, the code when executed by a processor cause the processor to perform the method of examples 1-23.

Example 50 is computer-readable medium storing computer executable code, the code when executed by a processor cause the processor to perform the method of examples 24-44.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication of a user equipment (UE), comprising:
   memory; and
   one or more processors coupled to the memory and configured to:
      receive, from a base station, a configuration for a channel state information (CSI) difference report that reports one or more statistics for a difference between at least one source CSI associated with a channel state information reference signal (CSI-RS) and at least one target CSI associated with a physical downlink shared channel (PDSCH) or a physical downlink control channel (PDCCH), wherein the configuration configures the UE to report the CSI difference report without reporting the at least one source CSI and the at least one target CSI; and
      transmit, to the base station, the CSI difference report based on the received configuration.

2. The apparatus of claim 1, wherein the at least one source CSI is measured based on the channel state information reference signal (CSI-RS), and wherein the CSI-RS is one of a periodic CSI-RS (P CSI-RS), a semi-persistent CSI-RS (SP CSI-RS), an aperiodic CSI-RS (AP CSI-RS), or a demodulation reference signal (DM-RS) associated with the PDSCH or the PDCCH.

3. The apparatus of claim 1, wherein the one or more processors coupled to the memory are further configured to:
   report the at least one source CSI and the at least one target CSI on periodic (P) uplink resources, semi-persistent (SP) uplink resources, or aperiodic (AP) uplink resources comprising a physical uplink shared channel (PUSCH) or a physical uplink control channel (PUCCH).

4. The apparatus of claim 1, wherein the one or more processors coupled to the memory are further configured to receive a mapping of the at least one source CSI and the at least one target CSI via one or more of radio resource control (RRC) signaling, medium access control (MAC) control element (CE) (MAC-CE), or DCI.

5. The apparatus of claim 1, wherein the CSI difference report is on one or more of: periodic (P) uplink resources, semi-persistent (SP) uplink resources, aperiodic (AP) uplink resources comprising a physical uplink shared channel (PUSCH) or a physical uplink control channel (PUCCH), an uplink resource that carries a hybrid automatic repeat request (HARQ) feedback comprising an acknowledgment (ACK) or negative ACK (NACK), or an uplink resource that does not carry the HARQ feedback comprising the ACK or the NACK.

6. The apparatus of claim 1, wherein the one or more statistics comprises one or more of:
   the difference between the at least one target CSI and the at least one source CSI,
   a minimum difference between the at least one target CSI and the at least one source CSI,
   a maximum difference between the at least one target CSI and the at least one source CSI,
   an average difference between the at least one target CSI and the at least one source CSI,
   a histogram for one or more differences between the at least one target CSI and the at least one source CSI, or
   a percentile statistic for the one or more differences between the at least one target CSI and the at least one source CSI.

7. The apparatus of claim 1, wherein the configuration further includes a set of triggering conditions for transmitting the CSI difference report, wherein the set of triggering conditions comprises a CQI difference threshold between the at least one target CSI and the at least one source CSI or a CQI statistics threshold based on the one or more statistics for the at least one target CSI and the at least one source CSI.

8. The apparatus of claim 1, wherein the CSI difference report is configured to be reported on a first uplink resource that is configured for the CSI difference report or a second uplink resource that is configured for a different known uplink transmission.

9. The apparatus of claim 8, wherein the CSI difference report is reported in a medium access control (MAC) control element (CE) (MAC-CE) on the second uplink resource that is configured for a physical uplink control channel (PUCCH).

10. The apparatus of claim 8, wherein the one or more processors coupled to the memory are further configured to dynamically request the first uplink resource in a scheduling request (SR) or an uplink control information (UCI) bit transmitted together with a hybrid automatic repeat request (HARQ) feedback.

11. The apparatus of claim 1, wherein the one or more processors coupled to the memory are further configured to request to transmit the CSI difference report via scheduling request (SR), medium access control (MAC) control element (CE) (MAC-CE), or uplink control information (UCI).

12. The apparatus of claim 1, wherein the one or more processors coupled to the memory are further configured to start a timer after transmitting the CSI difference report, and refraining from transmitting another CSI difference report until the timer expires.

13. The apparatus of claim 1, wherein the CSI difference report further comprises one or more CSI metrics including one or more of:
   a CQI difference metric,
   a reference signal received power (RSRP) difference metric,
   a signal to noise and interference ratio (SINR) difference metric,
   a reference signal received quality (RSRQ) difference metric, or
   a rank indicator (RI) difference metric.

14. The apparatus of claim 13, wherein the one or more CSI metrics are configured as a wideband CSI metric or a subband CSI metric in a bandwidth part (BWP).

15. The apparatus of claim 1, wherein the one or more processors coupled to the memory are further configured to determine a CQI difference per semi-persistent scheduling (SPS) occasion, wherein the PDSCH is an SPS PDSCH.

16. The apparatus of claim 1, further comprising a transceiver coupled to the one or more processors.

17. An apparatus for wireless communication of a base station, comprising:
   memory; and
   one or more processors coupled to the memory and configured to:
      transmit, to a user equipment (UE), a configuration comprising a set of triggering conditions for transmitting a channel state information (CSI) difference report that reports one or more statistics for at least one source CSI associated with a channel state information reference signal (CSI-RS) and at least one target CSI associated with a physical downlink shared channel (PDSCH) or a physical downlink control channel (PDCCH), wherein the configuration configures the UE to report the CSI difference report without reporting the at least one source CSI and the at least one target CSI; and
      receive the CSI difference report from the UE.

18. The apparatus of claim 17, wherein the at least one source CSI comprises measurements on the CSI-RS, and wherein the CSI-RS is one of a periodic CSI-RS (P CSI-RS), a semi-persistent CSI-RS (SP CSI-RS), or an aperiodic CSI-RS (AP CSI-RS).

19. The apparatus of claim 17, wherein the at least one target CSI comprises measurements on a demodulation reference signal (DM-RS) associated with the PDSCH or the PDCCH.

20. The apparatus of claim 17, wherein the one or more processors coupled to the memory are further configured to: configure the at least one source CSI and the at least one target CSI to be reported on periodic (P) uplink resources, semi-persistent (SP) uplink resources, or aperiodic (AP) (P/SP/AP) uplink resources comprising a physical uplink shared channel (PUSCH) or a physical uplink control channel (PUCCH).

21. The apparatus of claim 17, wherein the one or more processors coupled to the memory are further configured to transmit a mapping of the at least one source CSI and the at least one target CSI via one or more of radio resource control (RRC) signaling, medium access control (MAC) control element (CE) (MAC-CE), or downlink control information (DCI).

22. The apparatus of claim 17, wherein the one or more processors coupled to the memory are further configured to configure the CSI difference report to be reported on one or more of: periodic (P) uplink resources, semi-persistent (SP) uplink resources, aperiodic (AP) uplink resources comprising a physical uplink shared channel (PUSCH) or a physical uplink control channel (PUCCH), an uplink resource that carries a hybrid automatic repeat request (HARQ) feedback comprising an acknowledgment (ACK) or negative ACK (NACK), or an uplink resource that does not carry the HARQ feedback comprising the ACK or the NACK.

23. The apparatus of claim 17, wherein the one or more statistics comprises one or more of:
   the difference between the at least one target CSI and the at least one source CSI,
   a minimum difference between the at least one target CSI and the at least one source CSI,
   a maximum difference between the at least one target CSI and the at least one source CSI,
   an average difference between the at least one target CSI and the at least one source CSI,
   a histogram for one or more differences between the at least one target CSI and the at least one source CSI, or
   a percentile statistic for the at least one target CSI and the at least one source CSI.

24. The apparatus of claim 17, wherein the configuration further includes the set of triggering conditions for transmitting the CSI difference report, wherein the set of triggering conditions comprises a CQI difference threshold between the at least one target CSI and the at least one source CSI or a CQI statistics threshold based on the one or more statistics for the at least one target CSI and the at least one source CSI.

25. The apparatus of claim 17, wherein the one or more processors coupled to the memory are further configured to configure the CSI difference report to be reported on a first uplink resource that is configured for the CSI difference report or a second uplink resource that is configured for a different known uplink transmission.

26. The apparatus of claim 17, further comprising a transceiver coupled to the one or more processors.

27. A method of wireless communication of a user equipment (UE), comprising:
   receiving, from a base station, a configuration for a channel state information (CSI) difference report that reports one or more statistics for a difference between at least one source CSI associated with a channel state information reference signal (CSI-RS) and at least one target CSI associated with a physical downlink shared channel (PDSCH) or a physical downlink control channel (PDCCH), wherein the configuration configures the UE to report the CSI difference report without reporting the at least one source CSI and the at least one target CSI; and
   transmitting, to the base station, the CSI difference report based on the received configuration.

28. A method of wireless communication of a base station, comprising:
   transmitting, to a user equipment (UE), a configuration comprising a set of triggering conditions for transmitting a channel state information (CSI) difference report that reports one or more statistics for at least one source CSI associated with a channel state information reference signal (CSI-RS) and at least one target CSI associated with a physical downlink shared channel (PDSCH) or a physical downlink control channel (PDCCH), wherein the configuration configures the UE to report the CSI difference report without reporting the at least one source CSI and the at least one target CSI; and
   receiving the CSI difference report from the UE.

* * * * *